United States Patent
Duan et al.

(10) Patent No.: US 7,561,687 B2
(45) Date of Patent: *Jul. 14, 2009

(54) HINGE ASSEMBLY FOR A FOLDABLE ELECTRONIC DEVICE

(75) Inventors: Chao Duan, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 519 days.

This patent is subject to a terminal disclaimer.

(21) Appl. No.: 11/384,474

(22) Filed: Mar. 20, 2006

(65) Prior Publication Data
US 2006/0245586 A1 Nov. 2, 2006

(30) Foreign Application Priority Data
Apr. 29, 2005 (CN) .................... 2005 1 0034497

(51) Int. Cl.
*H04M 1/00* (2006.01)
*H04M 9/00* (2006.01)
(52) U.S. Cl. ................ 379/433.13; 455/575.3

(58) Field of Classification Search ........... 379/433.13; 455/90.3, 550.1, 575.3; 16/221, 223, 308, 16/303, 330; 361/814
See application file for complete search history.

(56) References Cited

U.S. PATENT DOCUMENTS

| 6,321,415 | B1 | 11/2001 | Frohlund |
| 6,493,542 | B1 | 12/2002 | Frohlund |
| 7,100,239 | B2 * | 9/2006 | Duan et al. .............. 16/303 |

* cited by examiner

*Primary Examiner*—Tuan D Nguyen
(74) *Attorney, Agent, or Firm*—Steven M. Reiss

(57) ABSTRACT

A hinge assembly (10) includes a shaft (12), a follower (16), and a driving means. The shaft has a screw portion (122) defined thereon. The follower has a screw hole (164) defined therein. The screw hole engages with the screw portion of the shaft. The driving means is configured for providing a driving force which makes the follower rotate relative to the shaft. The hinge assembly has only three main components, and occupies a relatively small volume. Accordingly, the space required in an application such as a mobile phone is reduced. In addition, that the engagement of the screw portion and the screw hole of the follower can dampen the opening action of the flip cover, thus protecting the flip cover from damage.

14 Claims, 3 Drawing Sheets

HINGE ASSEMBLY FOR A FOLDABLE ELECTRONIC DEVICE

BACKGROUND OF THE INVENTION

1. Field of the Invention

The present invention relates to hinge assemblies and, particularly, to a hinge assembly for foldable electronic devices, such as mobile telephones, electronic notebooks, and so on.

2. Discussion of the Related Art

With the development of wireless communication and information processing technologies, portable electronic devices such as mobile telephones and electronic notebooks are now in widespread use. These electronic devices enable consumers to enjoy high technology services anytime and anywhere. Consumers particularly favor foldable electronic devices due to their convenience and ease of storage.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and weight of portable foldable electronic devices. Thus, it is desirable that the hinge assembly coupling the main housing with the cover is modularized and miniaturized. A modularized hinge assembly has moving parts such as a cam member, a cam follower, a shaft, and a spring, held together in a unified structure. Either the cam member or the cam follower directly contacts the spring. The structure is easily and quickly attached to the main housing and the cover during mass production. The cam member and the cam follower always contact each other under the force of the spring.

Although suitable for some foldable electronic devices, sliding friction is produced between the cam member and the cam follower because of the relative rotation therebetween. This friction wastes energy (i.e., making opening and/or closing of the device more difficult) and causes abrasion of the cam member and the cam follower. The worn surface can further add to the friction therebetween and may eventually lead to premature malfunction or failure of the hinge assembly. In addition, the hinge assembly has many components, thus complicating manufacture. Moreover, during the process of opening and closing of a flip cover of the foldable electronic device, one of the cam member and the cam follower is quickly rotated under the spring force of the spring, which produces a large impact on the flip cover. Damage caused by these impacts may eventually lead to premature malfunction or failure of the foldable electronic device.

What is needed, therefore, is a hinge assembly which has a relatively simple configuration, which can be produced at low cost, and which has a low amount of friction associated therewith.

SUMMARY OF THE INVENTION

In a first preferred embodiment, a hinge assembly is provided for joining a flip cover to a main body of a foldable electronic device. A hinge assembly includes a shaft, a follower, and a driving means. The shaft has a screw portion defined thereon. The follower has a screw hole defined therein. The screw hole engages with the screw portion of the shaft. The driving means is configured for providing a driving force which makes the follower rotate relative to the shaft.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF PREFERRED EMBODIMENTS

Figure 1:
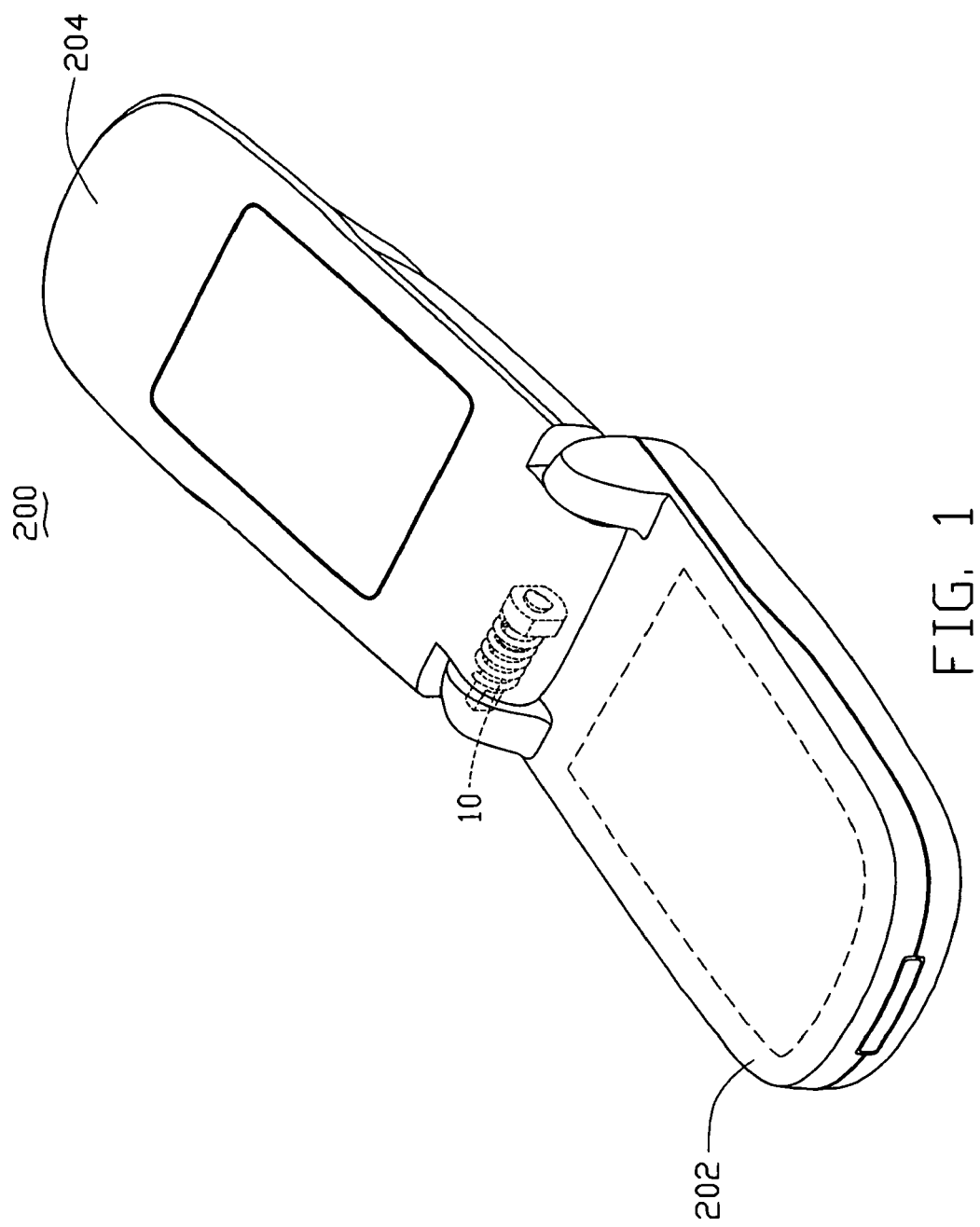
FIG. 1 is an schematic, isometric view of a flip-type mobile phone including a flip cover, a main body, and a hinge assembly, according to a first preferred embodiment, the hinge assembly being shown with dashed lines.

Referring now to the drawings, FIG. 1 shows a foldable electronic device such as a flip-type mobile phone 200, which includes a hinge assembly 10, according to a first preferred embodiment. The mobile phone 200 has a main body 202 and a flip cover 204. The main body 202 and the flip cover 204 are pivotally connected to each other via the hinge assembly 10. It should be noted that the hinge assembly 10 may also, for example, be used to interconnect components like a main body and a flip cover of any other kind of foldable device, other than the mobile phone 200.

Figure 2:
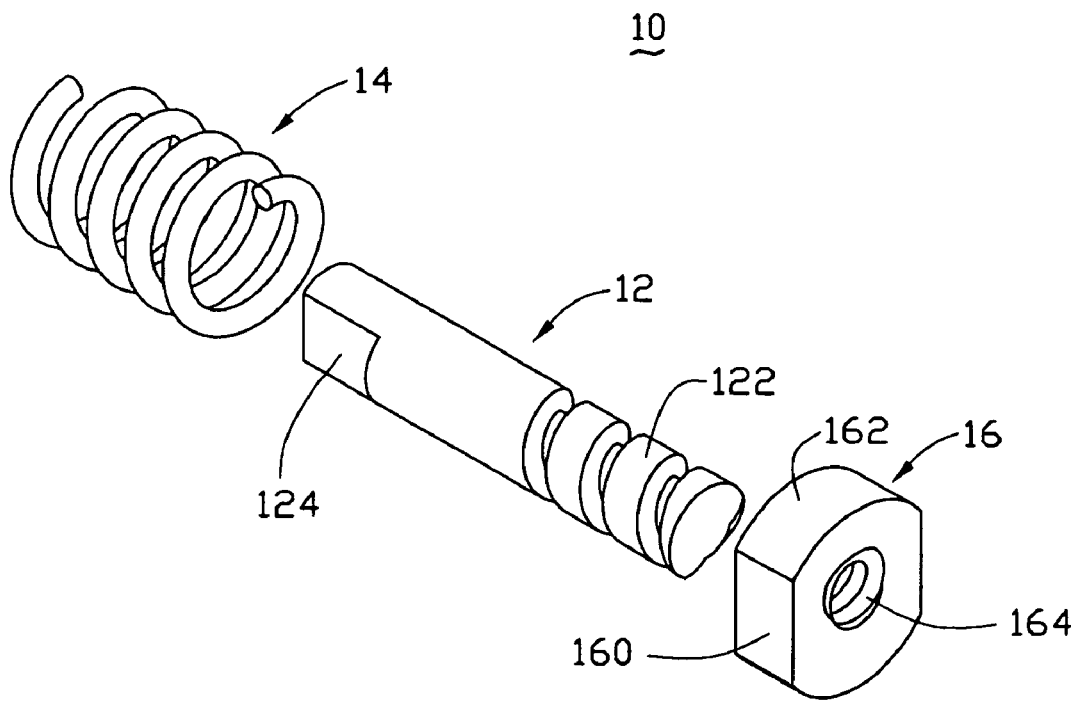
FIG. 2 is an enlarged, exploded, isometric view of the hinge assembly of FIG. 1.
Figure 3:
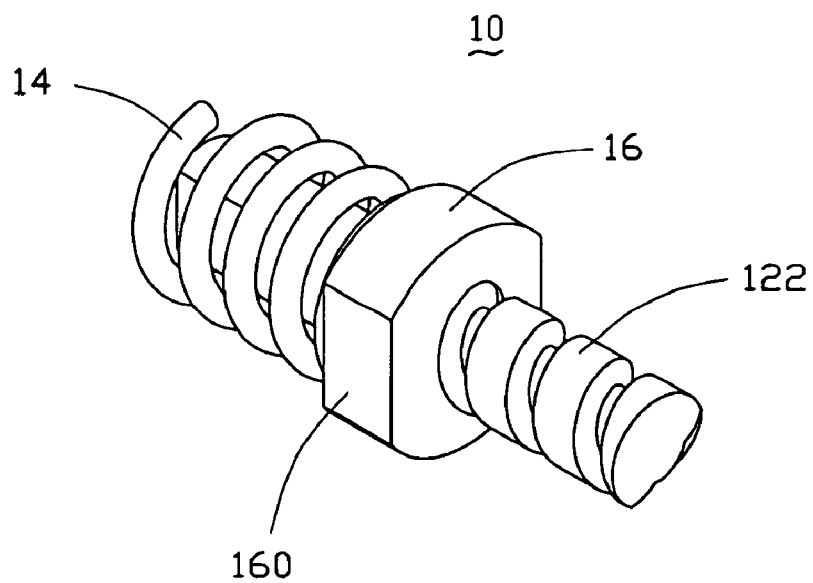
FIG. 3 is an enlarged, assembled view of the hinge assembly of FIG. 2.
Figure 4:
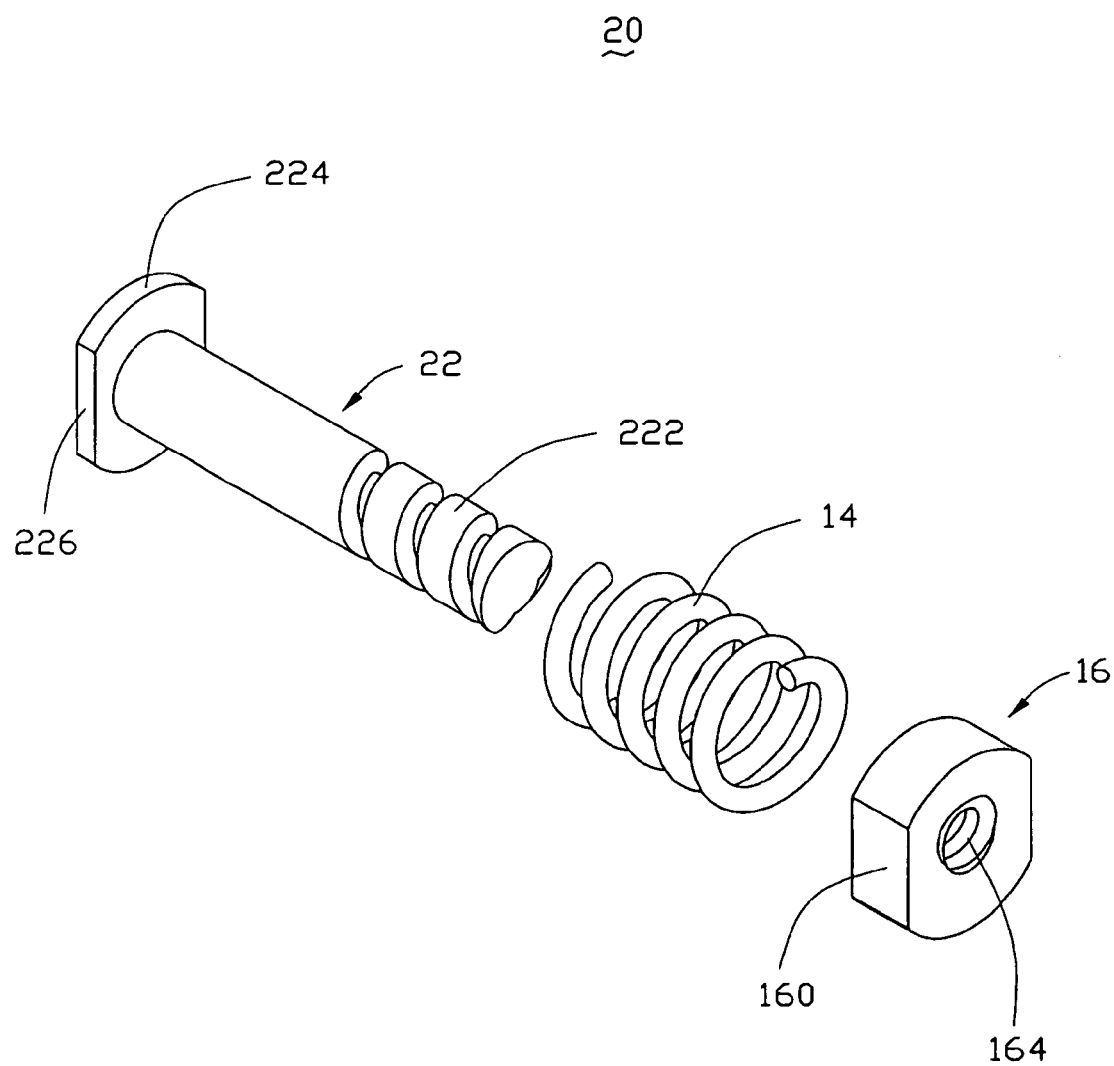
FIG. 4 is exploded, isometric view of a hinge assembly according to a second preferred embodiment.

Referring now to FIGS. 2-3, the hinge assembly 10 includes a shaft 12, a spring 14 functioning as a driving means, and a follower 16.

The shaft 12 includes a screw portion 122 at one end thereof, and a deformed end portion 124 functioning as a securing portion at the other end thereof.

The spring 14 is preferably helical and metallic. The spring 14 has an inner diameter larger than a diameter of the shaft 12. Thus, the spring 14 can be located around the shaft 12.

The follower 16 is generally cylindrical in shape. The follower 16 includes two opposite planar surfaces 160 and two opposite arcuate faces 162. The follower 16 has a screw hole 164 defined therein and extending therethrough. The screw hole 164 corresponds to the shape of the screw portion 122 of the shaft 10, thereby facilitating engagement with the shaft 12.

Referring to FIG. 1, in use, the follower 16 is engaged (i.e. operatively located/fixed) in a cavity (not shown) of the flip cover 204 of the mobile phone 200 via the planar surfaces 160, and cannot rotate relative to the flip cover 204. The deformed end portion 124 of the shaft 12 is engaged in the main body 202 of the mobile phone 200, and cannot rotate relative to the main body 202. Either end of the spring 14 resists the main body 202 and the follower 16. The flip cover 204 can rotate relative to the main body 202 between an open position and a closed position via the hinge assembly 10.

In the open position, the spring 14 is in a relaxed state. The flip cover 204 is opened relative to the main body 202. When the flip cover 204 is rotated from the open position to the closed position, the follower 16 rotates relative to the shaft 12.

Simultaneously, the follower 16 moves axially along the shaft 12 and compresses the spring 14 under the screw engagement of the screw portion 122 of the shaft 12 and the screw hole 164 of the follower 16. The flip cover 204 is continuously rotated until the flip cover 204 is locked on the main body 202 by a latch (not shown). When the flip cover 204 is locked on the main body 202 by the latch, the spring 14 accumulates a predetermined spring force as shown in FIG. 3. When opening the flip cover 204 again, the latch is unlocked, and the follower 16 rotates and moves axially along the shaft 12 under the force of the spring 14 and the screw engagement of the screw portion 122 of the shaft 12 with the screw hole 164 of the follower 16. Thus, the flip cover 204 is automatically opened.

Alternatively, two ends of the spring 14 can be respectively secured on the shaft 12 and the follower 16. Thus, the spring 14 can accumulate a torsion force when the follower 16 rotates and moves axially along the shaft 12 and compresses the spring 14, which increases the opening spring force of the flip cover 204.

In the embodiments described above, a main advantage of the hinge assembly 10 is that it has only three main components, and occupies a relatively small volume. Accordingly, the space required in an application such as a mobile phone 200 is reduced. In addition, the engagement of the screw portion 122 and the screw hole 164 of the follower can dampen the opening of the flip cover, so that the flip cover 204 is protected from damage, thus prolonging the useful lifetime of the mobile phone.

Referring to FIG. 3, a hinge assembly 20 is provided according to a second preferred embodiment of the present invention. The hinge assembly 20 includes a shaft 22, the spring 14 and the follower 16. The shaft 20 includes a screw portion 222 at one end thereof, and a flange 224 at the other end thereof. The flange 224 includes two opposite planar faces 226. The flange 224 of the shaft 20 is engaged in the main body 202 of the mobile phone 200, and cannot rotate relative to the main body 202. In this embodiment, two opposite ends of the spring 14 can be respectively secured on the flange 224 and the follower 16. When the flip cover 204 is opened excessively, a distance between the flange 224 of the shaft 20 and the follower 16 is increased, which stretches the spring 14. Therefore, the spring 14 has a tendency to return to its original state. Thus, under the influence of the spring 14 the flip cover 204 will tend towards a desired open position and will not over-rotate.

In further alternative embodiments, the spring 14 can be made of a nonmetallic material such as plastic. Furthermore, the spring 14 can instead be made of another kind of elastic element or driving means known in the art, such as a resilient cylinder. The planar surface 160 can be a stopper mechanism such as a groove or protrusion. It is also to be understood that the hinge assembly 10 may prove useful in other environments besides foldable electronic devices.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for a foldable communication device having a main body and a flip cover, the hinge assembly comprising:
   a shaft having a screw portion defined at one end thereof, the other end of the shaft being configured so as to be fixed relative to one of the main body and the flip cover;
   a follower having a screw hole defined therein, the screw hole engaging with the screw portion of the shaft, the follower being configured so as to be fixed relative to the other of the main body and the flip cover; and
   a driving means configured for providing a driving force which drives the follower to rotate relative to the shaft.

2. The hinge assembly as claimed in claim 1, wherein a shaft comprises a securing portion formed thereon, the securing portion being configured so as to be fixed with the one of the main body and the flip cover.

3. The hinge assembly as claimed in claim 2, wherein the securing portion is a deformed end portion.

4. The hinge assembly as claimed in claim 2, wherein the securing portion is a flange formed at one end the shaft, and the flange has at least one planar surface formed at an outer periphery.

5. The hinge assembly as claimed in claim 4, wherein the driving means has a first end and an opposite second end, the first end of the driving means abuts the flange, and the opposite second end of the driving means biases the follower.

6. The hinge assembly as claimed in claim 1, wherein the follower is cylindrical in shape, and has at least one planar surface formed thereon.

7. The hinge assembly as claimed in claim 1, wherein the driving means comprises a helical spring.

8. A foldable communication device, comprising:
   a main body;
   a flip cover; and
   a hinge assembly joining the flip cover to the main body, the binge assembly including:
   a shaft having a screw portion defined at one end thereof, the other end of the shaft being fixed relative to one of the main body and the flip cover;
   a follower having a screw hole defined therein, the screw hole engaging with the screw portion of the shaft, the follower being fixed relative to the other of the main body and the flip cover; and
   a driving means providing a driving force which makes the follower have a tendency to rotate relative to the shaft.

9. The hinge assembly as claimed in claim 8, wherein the shaft has a securing portion formed thereon, 10. The hinge assembly as claimed in claim 9, wherein the securing portion is a deformed end portion.

11. The hinge assembly as claimed in claim 9, wherein the securing portion is a flange portion formed at one end the shaft, the flange portion has at least one planar surface formed at outer periphery.

12. The hinge assembly as claimed in claim 11, wherein the driving means has a first end and an opposite second end, the first end of the driving means abuts the flange portion, and the opposite second end of the driving means biases the follower.

13. The hinge assembly as claimed in claim 9, wherein the follower is substantially cylindrical, and has at least one planar surface formed thereon.

14. The hinge assembly as claimed in claim 9, wherein the driving means is a helical.

* * * * *